Figure 1:
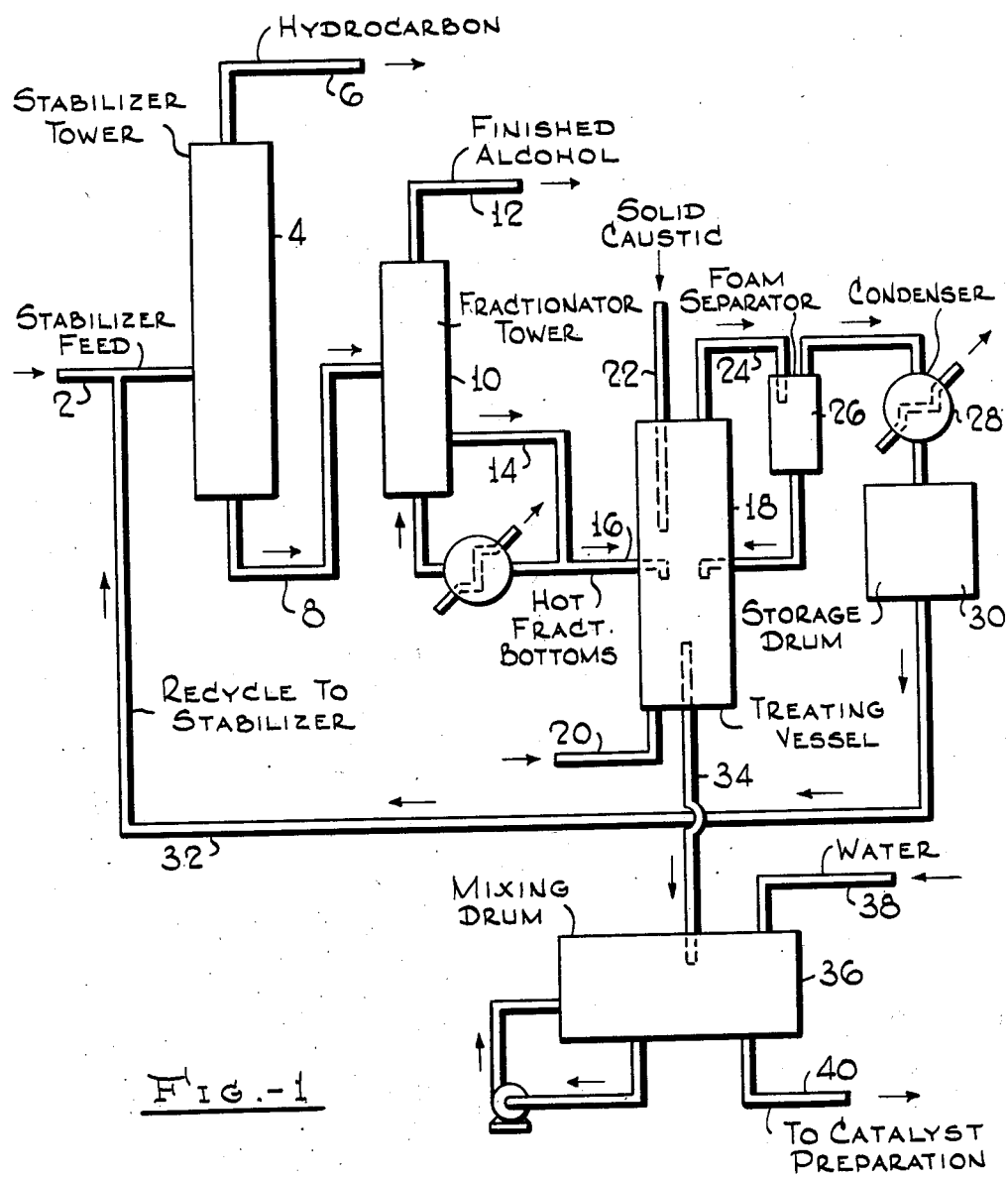

United States Patent Office 2,802,846
Patented Aug. 13, 1957

2,802,846

PREPARATION OF CATALYST AND FATTY ACIDS FROM OXO PROCESS BOTTOMS

Joseph Kern Mertzweiller, Baton Rouge, La., assignor to Esso Research and Engineering Company, a corporation of Delaware Application June 13, 1955, Serial No. 514,801

9 Claims. (Cl. 260—413)

The present invention relates to the preparation of organic compounds by the reaction of CO and $H_2$ with olefinic carbon linkages in the presence of carbonylation catalyst. More specifically, the present invention relates to the utilization of secondary reaction products formed in this process. Still more specifically, the present invention relates to an improvement in the preparation of the catalyst utilized in the foregoing reaction from the by-products of the alcohol recovery stage of the process.

The present invention is a continuation-in-part of copending application Ser. No. 273,907, filed February 28, 1952.

It is now well known in the art that oxygenated organic compounds may be synthesized from organic compounds containing olefinic linkages by a reaction with carbon monoxide and hydrogen in the presence of catalyst containing metals of the iron group, preferably cobalt, in a two-stage operation in which predominantly aldehydes and minor proportions of ketones, alcohols and other secondary reaction products are formed in the first step in the presence of the carbonylation catalyst, and the products from the first stage may then be hydrogenated in a second stage to convert the organic carbonyl compounds, containing one or more carbon atoms than the olefinic starting material, to the corresponding alcohol in the presence of a catalytic reducing agent such as nickel, copper chromite, sulfactive catalysts such as oxides and sulfides of tungsten, nickel, molybdenum and the like.

The carbonylation reaction provides a particularly attractive method of preparing primary alcohols to supply the large market for plasticizers, detergents, solvents and the like, and amenable to the reaction are most carbon compounds possessing an olefinic linkage.

The catalyst for the first stage of the process is usually employed in the form of an oil soluble compound of the catalytically active carbonylation metal. Thus, as suitable catalysts, are such organic salts as cobalt stearate, oleate or naphthenate. Catalyst concentrations may vary from about 0.5 to 5.0% by weight of the catalyst salt based on the olefinic feed. The first stage of the carbonylation reaction is generally carried out at temperatures in the range of from about 250° to 450° F. depending upon the nature of the olefin and other reaction conditions. In general, the lower olefins react at lower temperatures than the higher molecular weight olefins. Pressures are generally maintained in the range of 1500 to 4500 p. s. i. g.

One of the problems that has been encountered in the carbonylation reaction has been the formation of secondary reaction products and their utilization. These by-products arise out of numerous secondary reactions in the course of the main series of reactions which form alcohols containing one more carbon atom than the olefinic material from which they are prepared. Thus, the carbonylation reaction proper is a highly exothermic reaction with a heat release of the same high order of magnitude as in the hydrocarbon synthesis reaction, about 35 to 50 kcal./ gram-mol olefinic double bond reacted. For this reason, very careful temperature control is required in the carbonylation reaction zone to prevent decomposition of the carbonylation catalyst in its active form, the metal carbonyl such as cobalt carbonyl, to metallic cobalt. Above 3000 p. s. i. g. (1500 p. s. i. g. CO partial pressure) cobalt carbonyl starts to decompose at an appreciable rate above 350° F. The presence of cobalt metal catalyzes such secondary reactions as hydrogenation of the olefin feed, formation of hydrocarbon synthesis products from the $H_2$ and CO feed, polymerization of the aldehydes formed, by such reactions as aldol condensations, and the like. Other secondary reactions not necessarily catalyzed by metallic cobalt are formation of ketonic material produced by the interaction of two mols olefin per mol of carbon monoxide.

From the aldehyde synthesis stage the aldehydic product, containing in solution dissolved catalyst and admixed with unreacted olefins and secondary reaction products formed in the carbonylation stage, is generally withdrawn to a catalyst removal zone or decobalter where the material is heat-treated to decompose the active form of the catalyst such as cobalt carbonyl, to the metal or other forms of cobalt. Temperatures in the range of 150°–400° F. are required and the presence of the finely-divided metal resulting from the decomposition of the carbonylation catalyst favors such reactions as aldol condensations to form higher molecular weight oxygenated material and also reactions of the type known as the Cannizzaro reaction, wherein two mols of aldehyde react to form a mol of acid and a mol of alcohol.

The reaction products and unreacted material free of carbonylation catalyst are generally transferred to a hydrogenation vessel, where the aldehydes are hydrogenated to alcohols over either sulfur-sensitive or sulfactive hydrogenation catalysts at temperatures of about 150°–500° F. and pressures in the range of 1500–4500 p. s. i. g. As a result of the hydrogenation reaction alcohols are formed and these react to a certain extent with unchanged aldehydes to form acetals, unsaturated ethers, and saturated ethers. Thus, when a $C_7$ olefinic fraction is reacted with CO and $H_2$ under carbonylation conditions and the reaction product hydrogenated, the crude reaction product from the hydrogenation stage comprises the following:

| Material | Formation |
|---|---|
| $C_7$ Olefin and Paraffins | Unreacted and hydrogenated feed. |
| $C_8$ Olefins | Dehydration of alcohols. |
| $C_8$ Paraffins | Excessive hydrogenation of alcohols. Hydrogenolysis of ethers and acetals. |
| $C_8$ Alcohols | Principal product. |
| $C_8$ Aldehydes | Incomplete hydrogenation. |
| $C_{24}$ Acetals | Reaction between aldehydes and alcohols. |
| $C_{16}$ Alcohols | Aldolization, dehydration and hydrogenation. |
| $C_{16}$ Unsaturated Ethers | Reaction between aldehydes and alcohols. |
| $C_{16}$ Saturated Ethers | Reduction of acetals or unsaturated ethers. |
| Acids | Cannizzaro reaction; side reactions, acids from catalyst. |
| Esters | Reaction of above acids with alcohol. |
| Aldols | Higher molecular weight condensation products of aldehydes. |

The final stages of the process involve the separation of the desired hydrogenated material from the residual heavier products, and it is to these products that the present invention applies. As it is performed generally, the crude hydrogenation product, comprising the products enumerated in the illustration example above, is first subjected to a distillation process to distill overhead hydrocarbons boiling below the desired alcohol range, and the bottoms from this distillation, comprising the alcohol fraction, is subjected to a second distillation stage, where alcohols are taken overhead. The bottoms from this alcohol distillation, consisting as they do of polymeric material such as higher alcohols and carbonyl compounds, high molecular weight esters, ethers, acetals, acids, etc., have been considered to be of only secondary value as fuel. These bottoms, comprising usually 10–20% of the total hydrogenation product had the effect of cutting down substantially the yield and alcohol selectivity, and thus the economic attractiveness of the process.

From the above discussion it is readily apparent that the bottoms product is mainly formed at the expense of the desired alcohol, which is tied up and unavailable, as acetals, esters, unsaturated ethers, ethers, and the like, and this places a real strain upon the economics of the process.

A second problem is the availability of the catalyst for the reaction in an oil-soluble form. Though most, and probably all forms of cobalt catalyze the aldehyde synthesis or Oxo, reactions, an oil-soluble catalyst such as the cobalt salt of a high molecular weight fatty or organic acid has certain marked advantages not shared by oil-insoluble forms of cobalt. The principal advantage is that when an oil-soluble soap of cobalt is employed reaction rates are much more rapid due to the homogeneous conditions within the reactor, and so higher throughput rates may be employed than with oil-insoluble forms of cobalt. It has in the past, therefore, been suggested to carry out the reaction with such cobalt soaps as cobalt oleate, naphthenate or stearate.

To prepare these soaps, however, the free acid or its alkali salts are required and these are quite expensive and, in a commercial operation would add materially to the cost of preparing the alcohol. It has been determined that a 250 barrel per day plant operation would require an expenditure in oleic acid, for instance, of $140,000 annually.

It is, therefore, an object of the present invention to increase the yield of the desired alcohol product normally lost to by-products, and thus increase the economic attractiveness of the operation.

It is a further object of the present invention to decrease materially the cost of the alcohol synthesis operation by preparing the oil-soluble catalyst for the process from the by-product of the alcohol recovery operation.

A still further object of the present invention is a process for simultaneously converting alcohol bottoms product to fatty acid and recovering increased yields of desired alcohols.

Other and further objects and advantages of the present invention will become more clear and apparent hereinafter.

It has now been found that when the bottoms product following the alcohol distillation stage is treated with hot alkali, particularly hot solid caustic soda or potash at elevated temperatures of about 300°–550° F., preferably at atmospheric pressures, there is obtained a distillation product, after reaction is completed, comprising the same alcohol fraction that had hitherto been removed in the distillation stage. This alcohol was not present in the bottoms product, but resulted from the interaction of the hot solid alkali with the secondary reaction products hitherto enumerated, and may result from saponification of heavy esters. Simultaneously, as a result of caustic fusion of heavy alcohols present, which may have resulted from aldolization and other similar reactions, there is obtained a substantial quantity of fatty acids, which are recovered in a manner shown below.

It is important and essential from both the technical and the economic aspects of the process that the light alcohol product, i. e. the product having one more carbon atom than the olefin starting material, be removed simultaneously with the caustic fusion of the heavier material. It cannot be removed before the fusion stage, for it is in the form of high molecular weight compounds. Neither can it be recovered after the fusion stage, for then it would also be converted into the corresponding acid. But cobalt salts of relatively low molecular weight organic acids, such as iso-octanoic acid, which would be obtained if iso-octyl alcohol were subjected to contact for any length of time with solid caustic, are not soluble to any appreciable extent in the corresponding olefin fraction, i. e. a heptene fraction, and hence would not be suitable as homogeneous aldehyde synthesis catalyst. As a result of the present process, about 50–150% by weight of fatty acids over and above that originally introduced as cobalt soap may be obtained, accompanied by an increased alcohol yield of 2–6% by volume based on feed to the distillation stage.

The present invention will best be understood from the more retailed description hereinafter, wherein reference will be made to the accompanying drawing, Fig. 1, which is a schematic representation of a system suitable for carrying out a preferred embodiment of the invention. Inasmuch as the invention does not relate to the carbonylation, decobalting and hydrogenation section of the Oxo process, these have not been shown in the drawing, but may be of conventional design and operated under conditions of temperature, pressure, feed rates and the like, now well known in the art. For the purpose of illustration, a $C_7$ olefin fraction is the feed to the aldehyde synthesis stage, along with $H_2$, CO and an oil-soluble cobalt salt or soap; the feed to the hydrogenation zone comprises for the most part $C_8$ aldehydes admixed with the secondary reaction products comprising esters, acetals, aldols, etc., previously mentioned.

Turning now to the drawing, Fig. 1, crude alcohol product from the aldehyde hydrogenation stage (not shown) is passed via line 2 to stabilizer tower 4, wherein low boiling hydrocarbons formed as by-products in the reactions are withdrawn overhead through line 6. Thus, when a $C_7$ cut is subjected to the oxonation and hydrogenation reaction, these hydrocarbons may include heptane resulting from some hydrogenation of the heptene fraction, and octane resulting from over-hydrogenation of octyl aldehydes in the hydro stage. The temperature within tower 4 is maintained below the boiling point of the desired alcohol, here iso-octyl alcohol.

The desired alcohol fraction is withdrawn through line 8 and passed to still 10, wherein the finished alcohol is recovered. Fractionator 10 is maintained at atmospheric or subatmospheric pressures, and at temperatures sufficiently high to give reasonable good recovery of the desired alcohol. In the case of iso-octyl alcohol, this temperature is between 400°–550° F. One of the advantages of the present process is that inasmuch as additional alcohol is to be recovered subsequently, fractionation need not be too close, and hence somewhat lower temperatures than customary may be used, thus decreasing the possibility of cracking and decomposition in the still pot.

The hot bottoms product, which may represent about 15–35% of the total product fed to 10, is withdrawn through lines 14 and 16 and passed into treating vessel 18. Caustic, preferably as solid, though it may be added as an aqueous solution and the water then flashed off, is passed into vessel 18 through line 22. A temperature level is maintained in vessel 18 higher than the boiling point of the desired alcohol, and the vessel is preferably at atmospheric or even lower pressure. Caustic is added in amounts of about 5–15% based on an amount sufficient to react with the higher alcohols present. In the case of isooctyl alcohol bottoms, temperatures within 18 are about 350–500° F., and about 5–15% by weight of solid caustic is added. In accordance with the present invention, distillation of lower alcohols proceeds during the fusion of the higher alcohols, the lower alcohols distilling as soon as they are formed during the saponification reaction. To aid in the separation of light alcohols, a stripping gas such as nitrogen or hydrogen may be introduced through line 20. A residence time of the bottoms product of about 2–3 hours is desirable.

The light alcohol product is withdrawn continuously overhead through line 24 and foam separator 26. The distillate is then condensed in 28 and may be passed to storage drum 30 from where, on accumulation of adequate product, the accrued material is recycled back to the distillation system, preferably to the stabilizer tower 4, through line 32. As much as 2–6% alcohol may thus be recovered by this process, which otherwise would have been lost. It is essential within the treating vessel 18 to maintain no more than the minimum time of contact between the light alcohols and the caustic-containing liquid.

Turning back to vessel 18, after the desired residence time, a mixture of sodium soaps and some unsaponifiable material such as ethers, acetals and heavy hydrocarbons, are withdrawn from vessel 18 through line 34 and passed to mixing drum 36. Water in an amount of about 100–500% based on the bottoms, is passed into 36 through line 38, and mixing is continued till substantially all of the soap has passed into the water phase. Though the unsaponifiable material may be separated in the water phase by simple stratification, it may be advantageous to pass the unseparated product directly through line 40 to the catalyst preparation stage. In this operation a cobalt salt such as cobalt sulfate, acetate, etc. is reacted with the sodium salts of the fatty acids produced in accordance with the present invention to produce the corresponding cobalt salts. The unsaponifiable products are excellent solvents for the cobalt salts, and the concentrate formed may be passed directly to the aldehyde synthesis reaction zone. Also, by recycling the unsaponifiables, not only may there be a partial conversion of these to alcohols, but according to mass action principles, there would be less tendency to form them anew in the synthesis reaction, thus increasing the yield of useful products.

The invention admits of many variations and modifications obvious to those skilled in the art. Thus, it may be desirable to add the caustic as a solution to the stabilizer tower and flash overhead the water by entrainment.

The process of the invention and its results may be further illustrated by the following specific examples.

EXAMPLE I

To illustrate the composition of a typical alcohol bottoms product after the desired (here the $C_8$) alcohol has been removed, the following is presented. The alcohol has been prepared by treating a $C_7$ olefin fraction at about 325° F. and 3000 p. s. i. g. with CO, $H_2$ and a cobalt oleate catalyst, and the resulting crude aldehyde product after cobalt removal had been hydrogenated at about 500° F. over a molybdenum sulfide catalyst.

| Component | Approximate Concentration, Wt. Percent |
|---|---|
| $C_8$–$C_9$ Alcohol | 5 |
| $C_{16}$ Ether | 33 |
| $C_{16}$ Alcohol and/or Carbonyl Comp | 30 |
| $C_{22}$ Ester | 10 |
| $C_{24}$ Acetal | 22 |

These data indicate the approximate concentration of the principal components of the bottoms from production of iso-octyl alcohol. The 5% of $C_8$–$C_9$ alcohol is considered to result from inefficiencies in the initial distillation. The ester calculated as $C_{22}$ in the above table represents an additional 4% of recoverable alcohol, and if the molecular weight of the ester were assumed to be in the $C_{16}$ range, the recoverable alcohol would be on the order of 8%. However, it is significant that the total potentially recoverable alcohol (by means of conventional saponification processes) does not exceed 9–13 wt. percent on bottoms. Any additional $C_8$–$C_9$ alcohols would have to be formed from other components of the bottoms.

EXAMPLE II 1500 cc. of bottoms from commercial production of iso-octyl alcohol and 200 gms. of NaOH were treated in a shaker autoclave at 500° F. for 6 hours. The pressure increased to about 1000 p. s. i. g. The product was an almost white solid which dissolved in water to give a milky solution.

302 grams of the solid product was mixed with 2000 cc. of water at 130–135° F. and the pH of the mixture was adjusted to about 7 by the addition of 50% $H_2SO_4$. 200 cc. of $C_7$ olefin was added and the mixture agitated rapidly. Solid cobalt sulfate was added until there was a definite pink color in aqueous layer and stirring was continued for 15 minutes. The layers were separated in a funnel, the yield being 460 cc. of cobalt catalyst having a specific gravity of 0.8534 and a cobalt content of 3.23 wt. percent. This catalyst solution gradually precipitated a pinkish-purple solid on standing.

EXAMPLE III 1500 cc. of bottoms from commercial production of iso-octyl alcohol and 201 grams of NaOH were placed in a 3 liter flask fitted with a reflux condenser. The mixture was refluxed for 6 hours during which time the liquid temperature was 358°–362° F. The reflux condenser was replaced with a distillation condenser and a total of 565 cc. of distillate taken overhead. About 80% was obtained at a vapor temperature of 180°–220° C. The mixture was cooled and the residue dissolved in about 2500 cc. of hot water. The mixture was allowed to separate overnight and the aqueous layer amounted to 3320 cc. and the upper (unsaponifiables) was 315 cc. 1000 cc. of the aqueous layer and 95 cc. of the upper layer were mixed with 2000 cc. of water at about 135° F. and the pH of the mixture was adjusted to about 7 by addition of 50% $H_2SO_4$. 200 cc. of $C_7$ olefin was added and the mixture agitated rapidly. Solid cobalt sulfate was added until the aqueous layer showed a definite pink color. Stirring was continued for 15 minutes, mixture cooled and separated in a funnel. Yield was 420 cc. of cobalt catalyst having a specific gravity of 0.8628 and a cobalt content of 4.0 wt. percent. This solution showed separation of some forms of insoluble cobalt on standing.

EXAMPLE IV 1500 cc. of bottoms and 203 grams of solid NaOH were placed in a 3-liter flask fitted with a distillation condenser. A total of 421 cc. of distillate was collected to a maximum liquid temperature of 508° F. Most of the distillate boiled in the range of iso-octyl alcohol. The residue was cooled, dissolved in 1500 cc. of hot water and allowed to separate. Recovery was 2100 cc. of soap solution and 340 cc. of unsaponifiables. Preparation of the cobalt catalyst employing only the unsaponifiables as solvents gave a catalyst solution containing 6.8% cobalt and showed no tendency to precipitate insoluble cobalt compounds on standing. It is quite significant that the viscosity of this solution was not appreciably greater than that of a solution of cobalt oleate (4.5% cobalt) dissolved in a $C_7$ polypropylene fraction. The yield of cobalt (as catalyst) was 0.052 wt. percent on bottoms which compares with a yield of 0.020–0.030 if only the acids originally added as Oxo stage catalysts were recovered.

EXAMPLE V

The series of runs for which the data are given in the following table is designed to illustrate the effect of caustic concentration on the alcohol recovery and yield of cobalt catalyst.

Isolation of octyl alcohol and preparation of Oxo catalyst from fractionator bottoms
(BOTTOMS REPRESENTATIVE OF COBALT OLEATE OXO CATALYST)

| Run No | 4 | 5 | 6 | 7 | 8 |
|---|---|---|---|---|---|
| Added Caustic, Wt. Percent on Bottoms | None [b] | None [b] | None [c] | 10.2 | 4.9 |
| Distillation: | | | | | |
| Reflux Ratio | 5/1 | 10/1–20/1 | 5/1 | 5/1 | 5/1 |
| Total Time, Hrs | 2.3 | 4.6 | 2.7 | 2.8 | 2.9 |
| Liquid Temp. Range, °F | 352–466 | 356–470 | | | 350–435 |
| $C_8$–$C_9$ Alcohol Yield, Wt. Percent on Bottoms [a] | 21.4 | 22.2 | 15.2 | 24.9 | 24.1 |
| Unsaponifiables, Wt. Percent on Bottoms | | 55 | | 31 | 43 |
| Cobalt Soap Catalyst Solvent | Unsaponifiables [d] | Unsaponifiables [d] | | $C_7$ Olefin | Unsaponifiables [d] |
| Cobalt Content, Wt. Percent | 1.10 | 1.01 | | 4.84 | 4.69 |
| Yield, Wt. Percent Cobalt on Bottoms | 0.008 | 0.0075 | | 0.040 | 0.037 |

[a] Alcohol distilled at 100 mm. to 400° F. equivalent at 1 atm.
[b] Bottoms contained residual caustic and soaps from plant distillation.
[c] Bottoms washed with dilute acids and water to remove residual caustic.
[d] Unsaponifiables used in proportion to their presence in crude mixture.

In run No. 6 above, no caustic was present and the $C_8$–$C_9$ alcohol recovered consists of that which was not recovered in the primary distillation (previously indicated to be 5–10% on bottoms) plus an additional small amount (5–10%) which is considered to result from thermal decomposition of heavier components, e. g. hemi-acetals.

Runs 4 and 5 are representative of only a small amount of residual caustic (estimated at less than 1% on bottoms and introduced when the hydrogenated product was washed with aqueous caustic before the primary distillation stage). There resulted a considerable increase in the recovery of $C_8$–$C_9$ alcohols but the yield of cobalt catalyst prepared from the bottoms (after removal of the $C_8$–$C_9$ alcohol) was quite low.

In runs 7 and 8 additional caustic in a concentration of 5–10 wt. percent on bottoms was present. There resulted a further increase of 2–4% in the quantity of $C_8$–$C_9$ alcohol and the yield of cobalt catalyst was very good; 0.037–0.040 lb. of cobalt/lb. of bottoms. Oxonation tests with $C_7$ olefin showed that these catalyst preparations were fully equivalent to cobalt oleate.

EXAMPLE VI

This example illustrates the effect of prolonged heating in the presence of small amounts of residual caustic.

A representative sample of bottoms from the commercial production of iso-octyl alcohol showed the following boiling range in an A. S. T. M. distillation:

| I. B. P., °F. | 387 |
|---|---|
| 5% | 410 |
| 10% | 426 |
| 20% | 451 |
| 30% | 484 |

Figure 2:
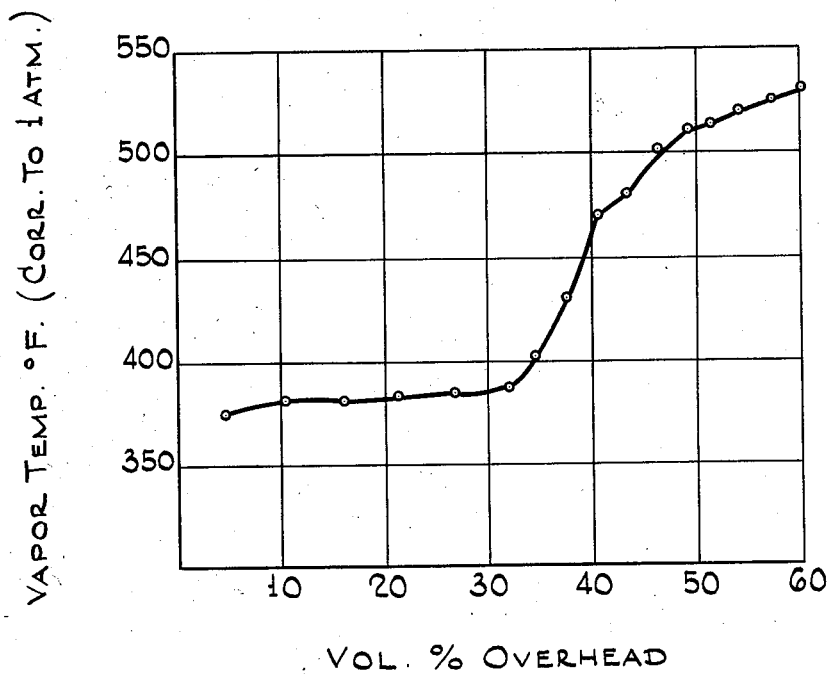

Since the heaviest $C_9$ alcohol components boil below 400° F., this sample of bottoms was expected to contain somewhat less than 10% in the $C_8$–$C_9$ alcohol range. These bottoms contained a small amount of residual caustic (resulting from incomplete removal after washing the hydrogenated Oxo product with aqueous caustic) and were fractionated on a 10 plate batch still, the total distillation requiring about 30 hours. The distillation data are plotted in Figure 2 and show the presence of about 35 volume percent boiling in the $C_8$–$C_9$ alcohol range.

The present invention may be subject to many variations apparent to those skilled in the art. Thus, besides caustic potash and soda, the bottoms may also be treated with LiOH, $Ba(OH)_2$, and $Ca(OH)_2$ and the like. The high molecular weight alkali soap prepared as an intermediate in the process may, if desired, be employed as surface active agents, or as intermediate in the manufacture of greases by incorporating them in lubricating oils.

It is most desirable to obtain the soaps from the higher molecular weight component of the bottoms, e. g. from the $C_{16}$ component during the preparation of $C_8$ alcohols as the principal product. The techniques described, principally that of continuously removing $C_8$ and lighter products during the course of the fusion process, are generally a satisfactory means of accomplishing this. The soaps, and corresponding acids recovered by acidification, do contain small amounts of the lighter components. In certain applications the presence of these lighter soaps or acids may be undesirable. Removal of the lower soaps or even more complete purification is conveniently accomplished by fractionation of the crude acids obtained by acidification of aqueous solutions of the soaps after removal of unsaponified materials. In this manner relatively pure $C_{16}$ acids and the corresponding alkali soaps are obtainable from the bottoms from iso-octyl alcohol production.

In many respects these $C_{16}$ acids and soaps are unique compositions of matter, not obtainable by other processes. Since the $C_{16}$ alcohols present in the $C_8$ alcohol bottoms are formed by aldolization type side reactions accompanying the carbonylation reaction, the acids and soaps corresponding to these alcohols are characterized by unusual chain branching which may be expected to confer unusual properties in such applications as formulation of greases and synthetic lubricants. The branched configurations may be illustrated diagrammatically

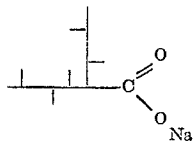

Two fairly long chains averaging 5–6 carbon atoms are joined to the alpha carbon. Each of these chains in turn has an average of about 2 shorter branches, generally methyl groups. Such structures are unique compositions which do not occur in nature and are not obtainable by other known synthetic processes.

What is claimed is:

1. In a carbonylation process wherein olefins are reacted with CO, $H_2$ and a carbonylation catalyst at elevated temperatures of from about 250° to 450° F., and pressures in the range of about 1500 to 4500 p. s. i. g., in a carbonylation zone to form reaction products comprising aldehydes, and wherein said reaction products are hydrogenated to form a hydrogenation product comprising alcohols containing one more carbon atom per molecule than said olefin, and wherein said hydrogenation product is passed to a distillation zone and said alcohol product is distilled overhead, the improvement which comprises recovering from said distillation zone a liquid product boiling higher than said alcohol product, contacting said high-boiling product at temperatures of from about 300 to about 550° F., with an alkali converting a portion of said product to a fatty acid salt, concomitantly withdrawing overhead an alcohol product boiling in substantially the same range as said first named alcohol product, and recovering substantial amounts of high molecular weight fatty acid salts having a larger number of carbon atoms per molecule than said alcohol product.

2. The process of claim 1 wherein said catalyst is cobalt.

3. In a carbonylation process wherein olefins are reacted with CO, H₂ and a cobalt carbonylation catalyst at elevated temperatures of from about 250° to 450° F., and pressures in the range of about 1500 to 4500 p. s. i. g., to form reaction products comprising aldehydes, and wherein said reaction products are hydrogenated to form a hydrogenation product comprising alcohols containing one more carbon atom per molecule than said olefin, and wherein said hydrogenation product is passed to a distillation zone and said alcohol product is distilled overhead, the improvement which comprises recovering higher boiling distillation bottoms from said last-named zone, contacting said bottoms with caustic in the substantial absence of water at a temperature of about 300–550° F. in a treating zone, withdrawing overhead in alcohol product having one more carbon atom per molecule than said olefin, and recovering fatty acid salts having a higher number of carbon atoms per molecule than said alcohol product.

4. The process of claim 3 wherein said treatment with caustic is carried out at atmospheric pressures.

5. The process of claim 3 wherein said caustic is added as a solid.

6. The process of claim 3 wherein said additional alcohol recovered is passed to said distillation zone.

7. The process of claim 3 wherein an inert stripping gas is passed into said caustic treating zone to aid in the separation of light alcohols.

8. The process of claim 3 which comprises passing said recovered salts to a mixing zone, adding water to said zone, extracting said salts in said water, contacting said salts with a cobalt-comprising material, converting said aqueous solution into cobalt soap and passing said soaps to said initial carbonylation zone.

9. The process of claim 8 comprising separating an aqueous layer from an organic layer of unsaponifiable matter in said mixing zone, converting said organic salts to cobalt soaps, and passing a mixture of said cobalt soaps and unsaponifiable material to said carbonylation zone.

References Cited in the file of this patent
UNITED STATES PATENTS

| | | |
|---|---|---|
| 2,537,577 | Fasce | Jan. 9, 1951 |
| 2,553,364 | Fasce | May 15, 1951 |
| 2,561,791 | Elwell et al. | July 24, 1951 |
| 2,727,050 | Sutton | Dec. 13, 1955 |
| 2,766,267 | Hill | Oct. 9, 1956 |